Figure 1:
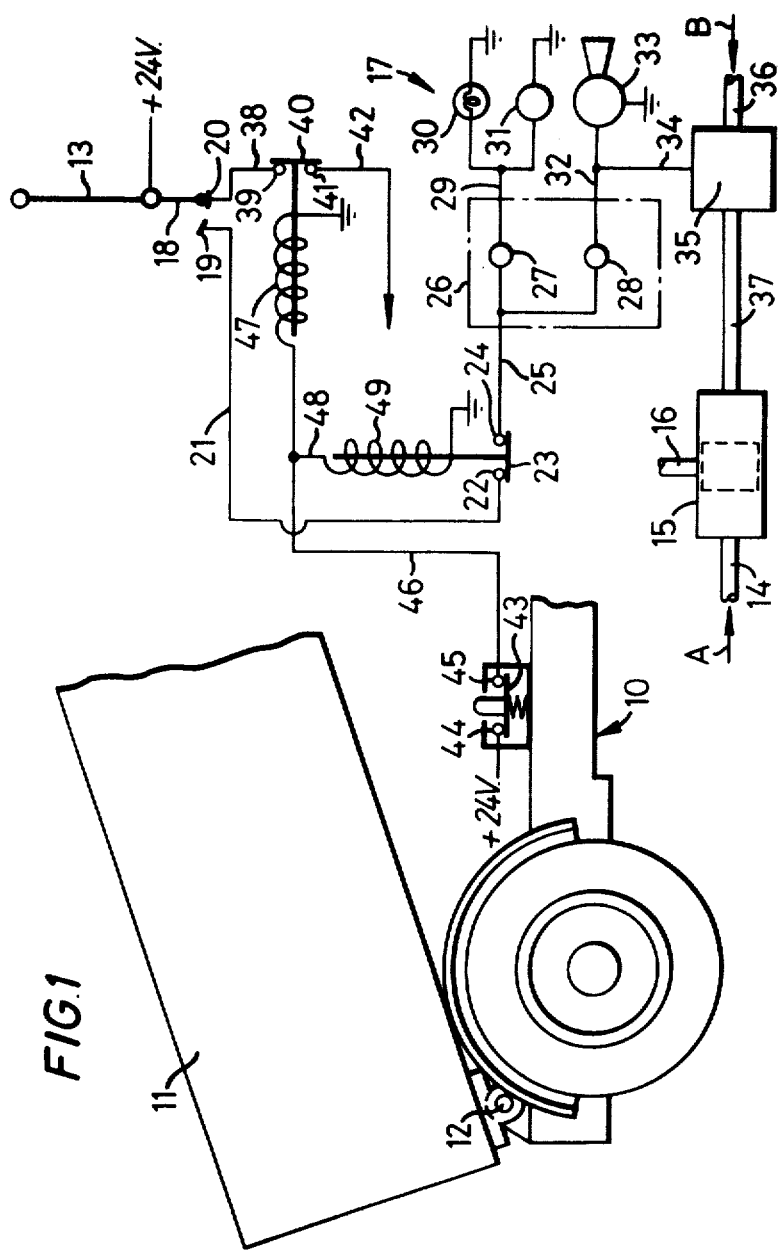

United States Patent [19]

Steel

[11] 4,442,915
[45] Apr. 17, 1984

[54] VEHICLE CONTROL APPARATUS

[75] Inventor: James Steel, Newcastle Upon Tyne, England

[73] Assignee: Ogden Electronics Ltd., Yorkshire, England

[21] Appl. No.: 249,636

[22] Filed: Mar. 31, 1981

[30] Foreign Application Priority Data

Sep. 25, 1980 [GB] United Kingdom ............... 8030905

[51] Int. Cl.³ .............................................. B60T 7/12
[52] U.S. Cl. ................................ 180/271; 298/17 R; 340/53
[58] Field of Search ............... 180/271, 272, 171, 287, 180/275, 281, 286; 340/52 R, 52 F, 53, 54, 56, 61; 200/61.88; 298/17 R, 22 C, 17 S, 17 SG; 303/1, 18, 19

[56] References Cited

U.S. PATENT DOCUMENTS

| | | | |
|---|---|---|---|
| 2,294,192 | 8/1942 | Meicrott | 200/61.88 |
| 2,887,672 | 5/1959 | Morano | 298/17 R |
| 3,269,783 | 8/1966 | Kriz | 180/275 |
| 3,735,346 | 5/1973 | Fox | 180/286 |
| 3,921,128 | 11/1975 | Snead | 340/52 |
| 4,074,787 | 2/1978 | Cunningham et al. | 180/271 |
| 4,136,328 | 1/1979 | Trobert | 180/271 |
| 4,178,580 | 12/1979 | Dombrowski | 180/271 |
| 4,222,033 | 9/1980 | Brown | 180/287 |

FOREIGN PATENT DOCUMENTS 1198106 12/1959 France .

*Primary Examiner*—Joseph F. Peters, Jr.
*Assistant Examiner*—Timothy Roesch
*Attorney, Agent, or Firm*—Cushman, Darby & Cushman

[57] ABSTRACT

Apparatus for limiting the allowed movement of a vehicle, such as a dump truck, when one of its components (e.g. the tippable truck bed or skip) is positioned out of its rest position. An interlock is provided which permits the vehicle to be driven for only a short distance with this component out of its normal rest position before the brakes of the vehicle are automatically applied. Thus, in the case of a dump truck, the vehicle can be driven forwardly with the bed raised only for a relatively short distance (e.g. so as to be moved clear of the load deposited by the tipped truck bed).

1 Claim, 3 Drawing Figures

VEHICLE CONTROL APPARATUS

DESCRIPTION

This invention relates to vehicle control apparatus for controlling movement of a vehicle having a movable component.

In the mining and construction industries, extensive use is made of heavy plant and, particularly, large dump trucks. A typical dump truck is a vehicle having a container, or skip, capable of carrying a load of up to 85 tons. The skip is pivotably mounted on an axis extending transversely of a rear end portion of the vehicle and is adapted to be pivoted on the axis so that a load contained in the skip can be tipped rearwardly of the vehicle and deposited on ground to the rear of the vehicle. In order to carry such large loads, the skip of such a vehicle is of large dimensions and mass.

In use, there is a tendancy for drivers to drive such vehicles forwardly after a load has been deposited from a skip of such a vehicle and with a central longitudinal axis of the skip still in an upwardly inclined forward direction compared with a wheelbase of the vehicle. Such practice on the part of drivers is discouraged because the elevated mass of the skip causes stress on the pivot connection between the skip and the body of the vehicle and also causes instablility of the vehicle during forward motion thereof. Furthermore, the forward upper surface of the skip, when the skip is in a raised position, extends for a considerable height above a drivers's cab of the vehicle and there is a danger that the forward surface of the skip may strike an object, such as an overhead structure, during movement of the vehicle relative to the object.

According to the present invention, there is provided vehicle control apparatus for controlling movement of a vehicle having a movable component, the apparatus comprising detection means for detecting when the component has moved from a pre-determined position relative to the vehicle, signal generating means for generating a signal when said detection means detects that said component has moved from said position and control means responsive to said signal for controlling operation of the vehicle, the arrangement being such that, when the component has moved from the pre-determined position and the vehicle moves in a pre-determined direction, the vehicle is constrained to move in the said direction for a pre-determined distance.

The control means may comprise an electrical circuit for controlling retarding means of the vehicle.

The circuit may comprise timing means.

The timing means may include a plurality of timing devices, at least one such timing device being operable to delay operation of said retarding means.

Said timing devices may be arranged to operate in sequence, operation of a subsequent timing device being delayed compared with operation of a preceding timing device.

Two said timing devices may be provided.

One of said timing devices may be adapted to control operation of an indicating device.

The said timing device may be adapted to control operation of a visual indicating device and an audible indicating device.

The other of said timing devices may be adapted to control an audible indicating device and to control operation of said retarding means.

The control means may be actuated on movement of a gear selection member of the vehicle for selecting a forward gear of the vehicle when the control means responds to a said signal.

Following is a description, by way of example only and with reference to the accompanying drawings, of one method of carrying the invention into effect.

Figure 2:
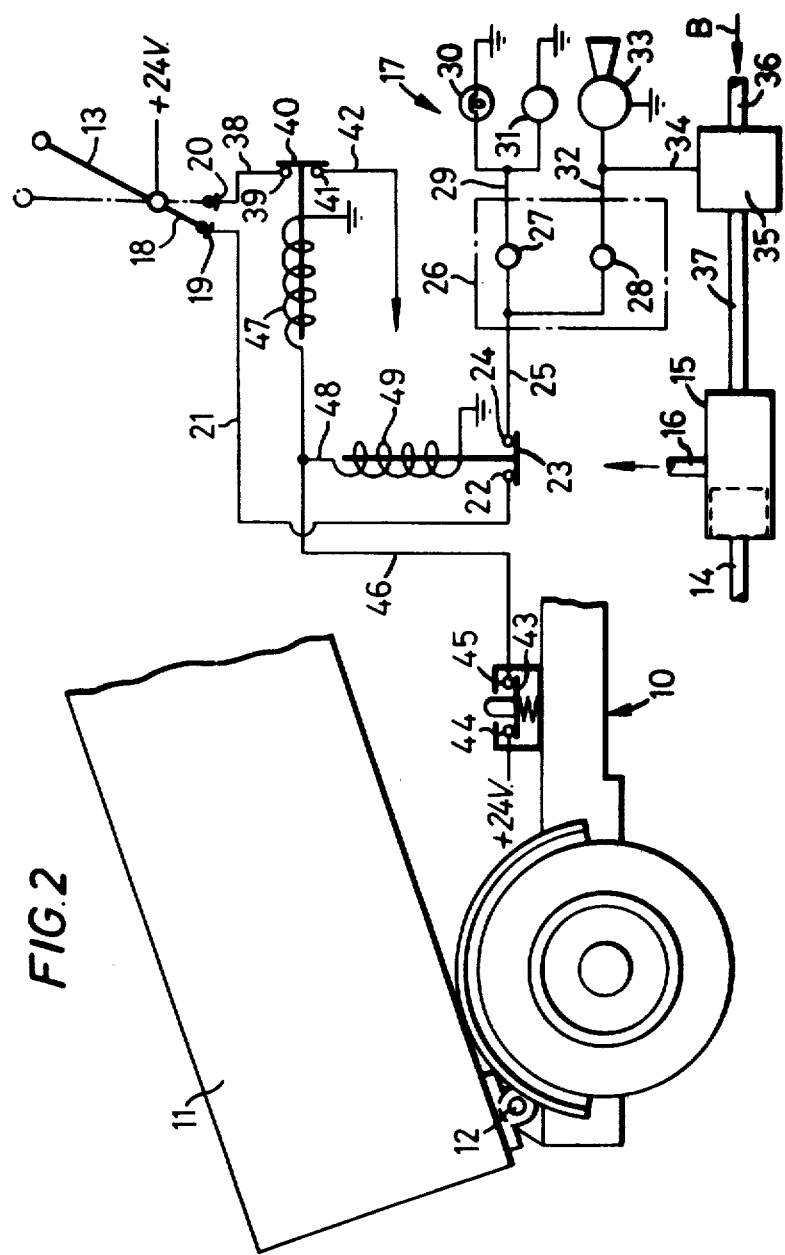
Figure 3:
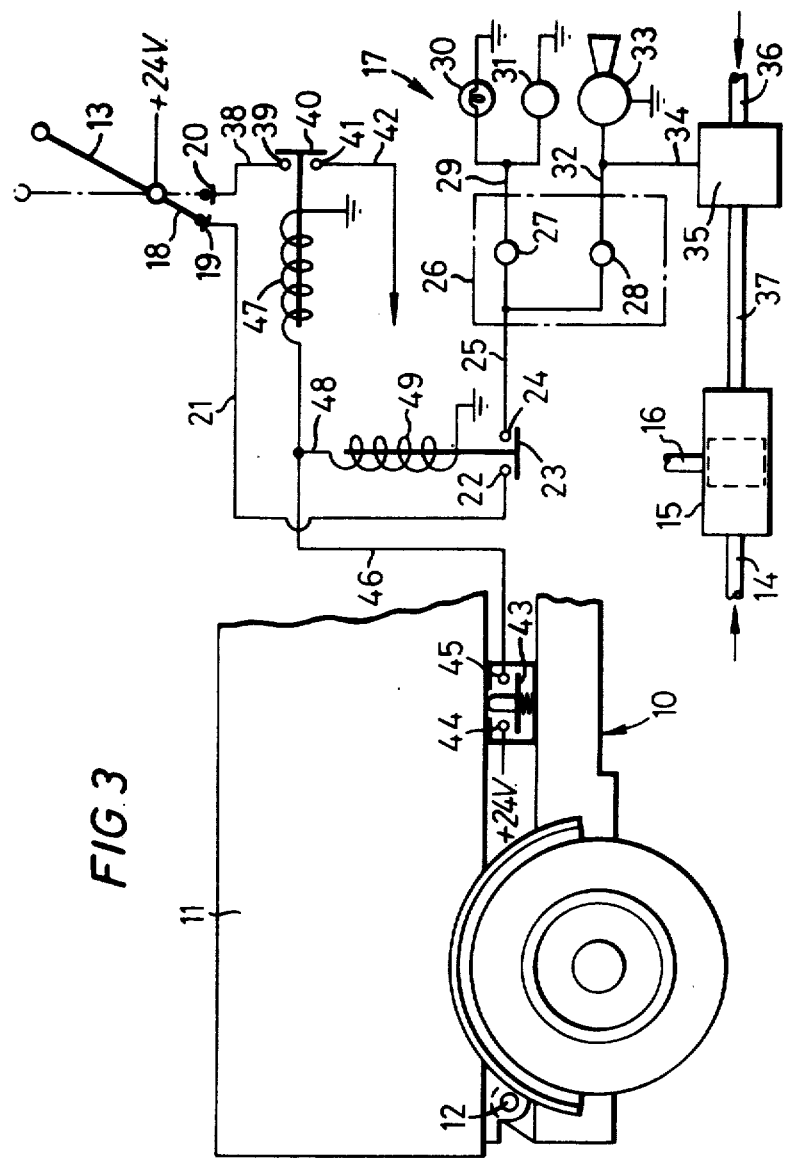

In the drawing:

FIG. 1 is a diagrammatic representation of apparatus in accordance with the present invention carried on a dump truck, the apparatus shown in a condition when the truck is stationary and a skip of the truck is being pivoted from a 'rest' position to deposit a load contained therein, FIG. 2 is a view similar to FIG. 1 but with the apparatus shown in a condition when the truck is driven forwardly with the skip pivoted from the 'rest' position and, FIG. 3 is a view similar to FIG. 1 and 2 but with the apparatus shown in a condition when the truck is driven forwardly with the skip lowered to the 'rest' position.

Referring now to FIG. 1 of the drawings, there is shown a portion of a dump truck 10 having a skip 11 pivotable on an axis 12 extending transversely of a rear portion of the truck to deposit a load contained therein. The truck 10 is provided with a gear lever 13 for selecting gears from a gear box (not shown) of the truck. The truck 10 is provided with a retarder (not shown) controlled by air pressure which is supplied through a conduit 14 in the direction of arrow A, an inlet of a slide valve 15, an outlet of the slide valve 15 and a conduit 16, the conduit 16 directing air from the slide valve 15 to the retarder.

The dump truck 10 is provided with apparatus 17 for restraining movement of the truck 10 beyond a predetermined distance when driven forwardly with the skip 11 pivoted from a 'rest' position in which a central longitudinal axis of the skip extends substantially parallel to a wheelbase of the truck. The apparatus comprises an electrical circuit including a switch 18 connected to a +24 volt supply and operable by the gear lever 13, the switch having terminals 19, 20. The terminal 19 is connected by a line 21 to a terminal 22 of a switch contact 23 the other terminal 24 of which is connected by a line 25 to a timing unit 26 including timers 27 and 28 connected in parallel one with another and the times 27, 28 being supplied by the line 25. The timer 27 is connected by a line 29 to a 'stop' lamp 30 which is earthed. The stop lamp 30 is connected in parallel with a buzzer 31 which is also earthed. The timer 28 is connected by a line 32 to a siren 33 which is earthed. The line 32 is tapped by a line 34 which is connected to a terminal of an electrically operable valve 35. The valve 35 has received in an inlet thereof an end portion of a conduit 36 for supplying therethrough in the direction of the arrow B from the vehicle brake system. An output of the valve 35 is connected to a second input of the slide valve 15 by means of a conduit 37.

The terminal 20 of the switch 18 is connected by a line 38 to a terminal 39 of a switch contact 40, a second terminal 41 of which is connected by a line 42 to transmission apparatus (not shown) effecting control of pivoting of the skip 11 on the axis 12.

The truck 10 has mounted thereon a resiliently biased switch 43, a terminal 44 of which is connected to a +24 volt supply and a second terminal 45 of which is connected by a line 46 to a coil of a solenoid 47, the armature of which operates the switch contact 40, the coil being earthed. The line 46 is tapped by a line 48 which is connected to a coil of a solenoid 49, the armature of which operates the switch contact 23. The arrangement of the switch 43 is such that, when the skip 11 is in a 'rest' position, the skip engages the switch 43 urging the switch against the resilient bias to an open condition. When, however, the skip is pivoted from the 'rest' position, the switch 43 is released and is urged by the resilient bias to a closed position causing a voltage surge through the coils of the solenoids 47, 49 thereby energising the solenoids resulting in closing of the switch contacts 23, 40.

In operation, the truck having a load contained in the skip 11 is reversed to a location at which the load is to be deposited. At the location, the brakes of the vehicle are applied and the gear lever 13 is moved to a 'neutral' position. In the 'neutral' position of the gear lever 13, the switch 18 is located in contact with the terminal 20. When power is transmitted to a transmission for elevating the skip 11, i.e. pivoting the skip rearwardly in an anti-clockwise direction of FIG. 1 on the pivot axis 12, downward force on the switch 43 applied by the skip against the resilient bias of the switch is released and the switch is urged by the resilient bias into contact with the terminals 44, 45 causing a voltage surge through the solenoids 47, 48 resulting in erergisation of the solenoids and in closing of the switch contacts 23, 40. In consequence, the voltage is directed through the lines 38 and 42 to the transmission apparatus for supplying auxillary power to a lift mechanism for the skip. The skip thus pivots in a rearward direction of the vehicle on the axis 12, as shown in FIG. 1, to an elevated position in which a central longitudinal axis of the skip is inclined upwardly and forwardly from the axis 12.

If, after depositing the load from the skip 11, the vehicle is driven forwardly with the skip remaining in an elevated position, the gear lever 13 would have been moved forwardly causing the switch 18 to move from engagement with the terminal 20 to engagement with the terminal 19, the switch 43 still connecting the terminals 44, 45. The condition would then be as shown in FIG. 2 wherein a voltage is directed through the line 21, the contact switch 23 and the line 25 to the timers 27, 28. The timer 27 delays transmission of the voltage from the line 25 to the line 29 for eight seconds. If, therefore, within a period of eight seconds a driver of the vehicle applies the brakes of the vehicle and moves the gear lever 13 to a 'neutral' position thereby moving the switch 18 from engagement with the terminal 19 and cutting off supply of voltage to the timer 27, no further action occurs regarding the timers 27, 28. If however, after eight seconds the vehicle is still driven forwardly, the voltage on line 25 is transmitted to line 29 causing the 'stop' lamp 30 to illuminate and the buzzer 31 to sound. If the driver takes no further action to arrest movement of the vehicle in a forward direction, after thirteen seconds the voltage applied to line 25 is transmitted to line 32 causing the siren 33 to sound and voltage to be applied to the valve 35 thereby opening the valve and permitting air at 90% of the total force of air supplied by a source of the brake system of the vehicle to be directed through the conduit 37 causing the slide valve 15 to operate and the air under pressure to be directed through the conduit 16 to the retarder of the vehicle. In consequence, the retarder is operated and the vehicle is retarded.

If the skip 11 is lowered to a 'rest' position, it will engage the switch 43 and urge the switch against the resilient bias causing disconnection of the terminals 44, 45 and cut off supply of voltage of the solenoids 47, 48 thereby opening the switch contacts 23, 40. In consequence, power to the transmission apparatus through the line 42 is cut off and voltage supply to the line 25 also is cut off thereby inhibiting operation of the valve 35 and supply of air through the conduit 37 to the slide valve 15. The condition is then as shown in FIG. 3.

It will be appreciated, therefore, that with apparatus in accordance with the present invention, a driver of a vehicle, when driving the vehicle forwardly with the skip 11 in an elevated position, is permitted to so drive the vehicle for a short distance, i.e. the distance travelled by the vehicle in up to eight seconds, thereby permitting the vehicle to move clear of the load deposited to the rear thereof while the skip is returned to a 'rest' position. If, however, the vehicle is driven forwardly with the skip raised for a period of eight seconds, the 'stop' lamp 30 is illuminated and the buzzer 31 is sounded. The driver thereby is warned that the vehicle has been driven forwardly for the permitted distance with the skip raised. If however, the driver persists in driving the vehicle forwardly after eight seconds with the skip raised, the siren 33 is sounded and the vehicle automatically is retarded by the retarder due to the operation of the valve 35 whereby supply of air in a brake system of a vehicle is directed to the retarder.

I claim:

1. Apparatus for automatically controlling the braking system of a truck having a tiltable bed which is normally in a predetermined rest position during safe motion of the truck and which truck has a gear selection mechanism for effecting motion of the truck, said apparatus comprising:

detection means for detecting a first condition when said tiltable bed is removed from its safe rest position and a second condition when said gear selection mechanism is placed in a gear for effecting motion of the truck and for producing a control output in response to concurrent detection of the first and second conditions;

timing control means for producing a time-delayed control signal in response to a continuation of said control output after a predetermined elapsed time interval from the time when said control signal is initially produced so as to thus allow the truck to effect motion for the duration of such an elapsed time interval; and automatic brake actuation means connected to respond to said time-delayed control signal by automatically actuating the braking system of the truck and thus retarding its further motion.

* * * * *